United States Patent [19]

Griffin

[11] 4,170,581

[45] Oct. 9, 1979

[54] METHOD AND COMPOSITION RELATING TO EMULSION-POLYMERIZED POLYDIMETHYLSILOXANES IN DURABLE PRESS RESINS

[75] Inventor: Howard E. Griffin, Greensboro, N.C.

[73] Assignee: Dow Corning Corporation, Midland, Mich.

[21] Appl. No.: 930,959

[22] Filed: Aug. 4, 1978

[51] Int. Cl.² .................. C08L 61/24; C08L 83/04
[52] U.S. Cl. .................. 260/29.4 R; 252/8.8; 260/29.2 M; 428/290
[58] Field of Search .................. 260/29.2 M, 29.4 R, 260/826; 252/88; 428/290

[56] References Cited

U.S. PATENT DOCUMENTS

| | | | |
|---|---|---|---|
| 2,891,920 | 6/1959 | Hyde | 260/29.2 |
| 3,061,567 | 10/1962 | Keil | 260/29.2 |
| 3,294,725 | 12/1966 | Findlay et al. | 260/29.2 |
| 3,360,491 | 12/1967 | Axon | 260/29.2 |
| 3,697,469 | 10/1972 | Ikoma | 260/29.2 M |
| 3,706,695 | 12/1972 | Huebner et al. | 260/185 X |
| 4,066,594 | 1/1978 | Moeller | 260/29.2 M |

FOREIGN PATENT DOCUMENTS 1161072  8/1969  United Kingdom.

*Primary Examiner*—Theodore E. Pertilla
*Attorney, Agent, or Firm*—George A. Grindahl

[57] ABSTRACT

Silicone-containing durable press resin compositions are prepared by polymerizing a polydimethylsiloxane which has been emulsified in an aqueous solution of dimethylolethylene urea or dimethyloldihydroxyethyleneurea. The resulting homogeneous aqueous compositions have improved resistance to separation after freeze-thaw cycling. Advantageously, more highly concentrated aqueous compositions comprising a silicone-containing durable press resin are available by the method of this invention. The silicone-containing durable press resin compositions are useful for providing wrinkle-recovery and permanent press to cellulose-containing fabrics.

8 Claims, No Drawings

METHOD AND COMPOSITION RELATING TO EMULSION-POLYMERIZED POLYDIMETHYLSILOXANES IN DURABLE PRESS RESINS

BACKGROUND OF THE INVENTION

This invention relates to a method for preparing a homogeneous aqueous composition comprising a polydimethylsiloxane and a durable press resin and to the compositions obtained therefrom. By durable press it is meant herein the wrinkle-resistant property and/or the permanent-crease property displayed by resin-treated cellulose-containing fabrics.

Durable press resins and silicone compositions have been individually used for a long time to provide improved properties of textiles. In addition, to further improve the physical properties of textiles treated with durable press resins, silicone materials have been combined with durable press resins to provide improved hand, tear strength, and abrasion resistance to the treated textile.

It is known, for example, to prepare a textile-treating bath by admixing an aqueous emulsion of a hydroxy-endblocked polydimethylsiloxane with an aqueous solution of a durable press resin in the presence of additional water and optionally, a surfactant. Furthermore, it has been disclosed and claimed by Rooks in a copending U.S. patent application, Ser. No. 895,827, filed on Apr. 13, 1978 and assigned to the assignee of this application, that a textile-treating bath may be prepared more advantageously by blending the concentrated aqueous emulsion of a hydroxy-endblocked polydimethylsiloxane with the concentrated aqueous solution of a durable press resin and, optionally, a surfactant, thereby obtaining certain processing advantages, and thereafter diluting the blend with additional water. The blends of Rooks are particularly stable to the skinning-over that often occurs with silicone emulsions that are exposed to the atmosphere.

One disadvantage of the above methods is the tendency of the silicone emulsion and the blend of silicone emulsion with durable press resin solution to separate, such as by creaming or occasionally by breaking, after being subjected to one or more freeze-thaw cycles. Although the blends are easily reemulsified, problems with storage of these materials are introduced by this disadvantage.

Another disadvantage of the above methods is the necessity of processing, shipping and storing relatively large quantities of water as a component of the silicone emulsion, the durable press resin solution and their blends that are used to prepare the textile-treating bath. Additional economies could be realized if the quantity of water in these compositions that are subsequently used to prepare the textile-treating bath could be reduced.

The present method comprising emulsion polymerization of lower-molecular-weight polydimethylsiloxanes in a solution of durable press resin provides a means for overcoming the above-mentioned disadvantages. The resulting homogeneous aqueous composition obtained therefrom has improved stability to separation after freeze-thaw cycling. In addition, since the water of the homogeneous aqueous composition of this invention serves a dual role in dissolving the durable press resin and functioning as the continuous phase during the emulsion polymerization of the polydimethylsiloxane, more highly concentrated compositions are made available, greater economies are realized and compositions of greater utility are obtained than are present in the prior art.

Polymerization of siloxanes in aqueous emulsion is well known from Hyde et al., U.S. Pat. No. 2,891,920; Findlay et al., U.S. Pat. No. 3,294,725; and Axon, U.S. Pat. No. 3,360,491. Further improvements are disclosed by Ikoma, U.S. Pat. No. 3,697,469 and by Huebner et al., U.S. Pat. No. 3,706,695. In addition, British Pat. No. 1,161,072 describes the polymerization of polysiloxanes in an aqueous emulsion comprising an olefinically unsaturated organic monomer. However, none of these references indicate that emulsion polymerization of siloxanes can be accomplished in an aqueous solution of a durable press resin. It was unexpected to find that polydimethylsiloxanes could be emulsion-polymerized in an aqueous solution of a durable press resin using a strong acid catalyst since it is known that durable press resins are normally cured with an acid catalyst or latent acid catalyst. It was also unexpected to find that the resulting composition comprising a polydimethylsiloxane and a durable press resin had improved stability toward separation after freeze-thaw cycling, compared to a blend of polydimethylsiloxane emulsion and durable press resin solution.

SUMMARY OF THE INVENTION

It is an object of this invention to provide a new method for preparing a homogeneous aqueous composition comprising a polydimethylsiloxane and a durable press resin.

It is another object of this invention to provide a new and improved homogeneous aqueous composition comprising a polydimethylsiloxane and a durable press resin and having improved resistance to separation after freeze-thaw cycling.

It is also an object of this invention to provide a method for preparing a more concentrated homogeneous aqueous composition comprising a polydimethylsiloxane and a durable press resin than the prior art methods provide.

These and other objects relating to the siloxane polymerization art and to the textile-treating art will be obvious to the skilled practioneer of these arts upon consideration of the following disclosure and appended claims which relates to a method, and compositions obtained therefrom, comprising emulsifying and polymerizing a polydimethylsiloxane in an aqueous solution of a durable press resin, using a surface-active catalyst to effect said emulsifying and said polymerizing. The product of this invention is a homogeneous aqueous composition which is useful for preparing a textile-treating bath. By homogeneous it is meant a uniform composition such as a solution or an emulsion.

DESCRIPTION OF THE INVENTION

This invention relates to a method for preparing a homogeneous aqueous composition comprising a polydimethylsiloxane and a durable press resin, and to the compositions obtained therefrom, said method comprising (A) preparing an emulsion consisting essentially of (i) a polydimethylsiloxane having a viscosity of less than 100 mPa·s at 25° C. and being selected from the group consisting of cyclopolydimethylsiloxanes and hydroxy-endblocked linear polydimethylsiloxanes, (ii) a surface-active siloxane-polymerization catalyst selected from aliphatic hydrogen sulfates and hydrocarbonsulfonic acids and (iii) an aqueous solution of a durable press resin selected from dimethylolethylene urea and dimethyldihydroxyethylene urea, (B) allowing the emulsified polydimethylsiloxane to polymerize until a desired increase in molecular aggregation has been obtained, and thereafter (C) neutralizing the surface-active catalyst.

In the method of this invention the polydimethylsiloxane (i) to be emulsion-polymerized may be a cyclic polydimethylsiloxane or a hydroxy-endblocked linear polydimethylsiloxane or their mixtures in any proportion. To provide a stable emulsion for subsequent emulsion polymerization the polydimethylsiloxane (i) should have a viscosity of less than 100 mPa·s, preferably less than 50 mPa·s at 25° C. To provide a homogeneous aqueous composition having long-term shelf-stability against separation, polydimethylsiloxane (i) should have an average of fewer than 10 silicon atoms per molecule. In view of the above, and because cyclic polydimethylsiloxanes have a lower viscosity than hydroxy-endblocked linear polydimethylsiloxanes having the same number of silicon atoms per molecule, polydimethylsiloxane (i) is most preferably a cyclopolydimethylsiloxane.

The cyclopolydimethylsiloxanes that are suitable for use as (i) in the method of this invention have the well-known formula $(Me_2SiO)_x$ wherein Me denotes the methyl radical and x has an average value of at least 3, preferably 3 to 9. Cyclopolydimethylsiloxane (i) may be a single siloxane such as the cyclic trimer wherein x is 3 or the cyclic tetramer wherein x is 4 or a mixture of cyclic siloxanes wherein x has an average value of greater than 3. A particularly useful cyclopolydimethylsiloxane (i) is a commercial mixture consisting mainly of the cyclic tetramer, i.e. octamethylcyclotetrasiloxane, and trace-to-minor portions of cyclic trimer, pentamer and hexamer.

The hydroxy-endblocked linear polydimethylsiloxanes that are suitable for use as (i) in the process of this invention have the well-known formula $HO(Me_2SiO)_yH$ wherein Me denotes the methyl radical and y is an integer greater than zero such as 1, 2, 3, 4, 7, 10, 15, 20, 30 50, and more. Linear, hydroxy-endblocked polydimethylsiloxane (i) may be a single compound such as the tetramer diol, wherein y has a value of 4 or a mixture of linear siloxanes wherein y has an average value greater than 1. Hydroxy-endblocked, linear polydimethylsiloxanes are most conveniently available and used in this invention as mixtures of molecules having various values of y. Said mixtures have an average value of y of approximately 60, preferably less than 25, and most preferably less than 10 corresponding to polydimethylsiloxanes having viscosities of less than 100, 50 and 30 mPa·s (1 millipascal seconds=1 centipoise; ASTM E380-72, Metric Practice Guide dated Nov. 28, 1973) at 25° C., respectively.

It is to be understood that polydimethylsiloxane (i) may contain trace amounts of endblocks other than hydroxy such as hydrogen, methoxy, chloro, and methyl and siloxane units other than $Me_2SiO$, such as $MeSiO_{3/2}$ and $SiO_{4/2}$ which may be present in commercial polydimethylsiloxanes, incidental to their method of preparation. Preferably polydimethylsiloxane (i) is free of said other endblocks and said other siloxane units. Cyclic and linear polydimethylsiloxanes and their preparations are well known and need no further comment.

The surface-active component (ii) that is used in the method of this invention is an emulsifying agent and a polymerizing catalyst which serves to emulsify and polymerize the polydimethylsiloxane (i). There is a wide variety of surface-active catalysts that can be used in the processes of this invention, each being classified either as an aliphatic hydrogen sulfate or a hydrocarbonsulfonic acid. In order to perform satisfactorily the surface-active catalyst must have the proper balance of water and oil solubility. This solubility balance is, of course, determined to a large extent by the hydrocarbon portion of the compound.

Illustrative of the aliphatic hydrogen sulfates that are useful as component (ii) in this invention are compounds of the formula $ROSO_3H$ wherein R denotes a monovalent aliphatic hydrocarbon radical having at least 6 carbon atoms, preferably at least 8 carbon atoms and most preferably from 10 to 18 carbon atoms. The R radicals may be straight-chained or branched and included, for example, hexyl, octyl, decyl, dodecyl, cetyl, stearyl, myricyl, oleyl and octynyl. Aliphatic hydrogen sulfates are well-known compounds and can be made according to known techniques, such as by the reaction of an alcohol, preferably a primary alcohol, with sulfuric acid or chlorosulfuric acid. U.S. Pat. No. 3,360,491 to Axon is hereby incorporated herein by reference to show suitable aliphatic hydrogen sulfates that may be used in the method of this invention.

Illustrative of the hydrocarbonsulfonic acids that are usefl as component (ii) in this invention are the aliphatically substituted benzenesulfonic acids, the aliphatically substituted naphthalenesulfonic acids, the aliphatic sulfonic acids, silylalkylsulfonic acids and the aliphatically substituted diphenylethersulfonic acids. The aliphatic substituents therein are as denoted above for R and contain at least 6 carbon atoms, and preferably contain no more than about 18 carbon atoms.

The preferred surface-active catalysts to be used in the method of this invention are the aliphatically substituted benzenesulfonic acids of the formula $RC_6H_4SO_3H$ wherein R is a monovalent aliphatic hydrocarbon substituent of at least 6 carbon atoms. Thus, suitable aliphatic substituents (R) include hexyl, octyl, decyl, dodecyl, cetyl, myricyl, nonenyl, phytyl and pentadecadienyl. Preferably the R radical has at least 8 carbon atoms, most preferably at least 10, and can be straight or branched chain. Hydrocarbonsulfonic acids are well-known compounds and can be made according to well-known techniques; many are commercially available. U.S. Pat. No. 3,294,725 to Findlay et al., is hereby incorporated herein by reference to show suitable hydrocarbonsulfonic acids that may be used in the method of this invention.

The surface-active catalyst (ii) can be a single compound or a mixture of two or more compounds, each member of the mixture falling within the above recited classification as an aliphatic hydrogen sulfate or a hydrocarbonsulfonic acid. In practice mixtures of said hydrogen sulfates or of said sulfonic acids are generally employed, since these high molecular weight acids are difficult to purify to a single specie, and also because mixtures function quite as well as single compounds. Commercially available materials, generally billed as single compounds, are usually mixtures wherein the average molecular configuration is as described above. For example, a material highly preferred for use as component (ii) and sold as dodecylbenzenesulfonic acid is a mixture containing substituted benzenesulfonic acids wherein the substituent ranges from perhaps nonyl to pentadecyl, but averaging dodecyl (i.e. twelve carbon atoms per R group). Thus, in this specification, reference to the size of the aliphatic chain on the substituted benzenesulfonic acid is to the average length of said substituent, as per the above explanation, unless otherwise specified.

It will be obvious to those skilled in the art that the surface-active catalyst per se may be used or a salt of the surface-active catalyst, such as a sodium salt may be used and at least a sufficient quantity thereof converted to the surface-active acid form, in situ, to effect polymerization of the emulsified polydimethylsiloxane (i). As noted below, salts of the surface-active catalysts are among the surfactants that may be additionally used in the method of this invention.

Component (iii) of the emulsions that are prepared in the method of this invention is an aqueous solution of a durable press resin selected from dimethylolethylene urea and dimethyloldihydroxyethylene urea. These durable press resin solutions, conveniently designated in the art as DMEU resin and DMDHEU resin, respectively, consist essentially of monomeric molecules of 1,3-bis(hydroxymethyl)-2-imidazolidinone and 1,3-bis(hydroxymethyl)-4,5-dihydroxy-2-imidazolidinone, respectively, and may further contain trace-to-small amounts of precursor materials such a formaldehyde, urea, ammonia and glyoxal and higher molecular weight, condensed ethylene urea. It is to be understood that any of these various compositions containing said monomers and trace-to-small amounts of condensed ethylene urea and precursors are included in the general term of "aqueous solution of durable press resin" as used herein. DMEU and DMDHEU durable press resins are well known and are commercially available in undiluted form or as concentrated solutions, pastes and creams from which an aqueous solution thereof may be prepared.

An aqueous solution of dimethyloldihydroxyethylene urea is highly preferred for use as component (iii) in the method of this invention since it provides, by this invention, a homogeneous aqueous composition comprising a polydiorganosiloxane and a durable press resin which has long-term shelf-stability toward separation when used with a cyclopolydimethylsiloxane as component (i). While not wishing to be limited by theory, it is believed that this long-term shelf-stability is related to the low acid-sensitivity exhibited by DMDHEU resins, compared to other durable press resins.

The concentration of the aqueous solution of durable press resin to be used in the process of this invention may have any positive value up to a saturated solution of resin in water at 25° C. In accordance with one aspect of this invention it is desirable to use as concentrated a solution of durable press resin as is possible, such as, for example, 40 to 60 weight percent resin, although more dilute solutions may be used if desired.

A preferred concentration range of durable press resin in water is one which provides from 20 to 40 parts by weight, both inclusive, of durable press resin for every 100 parts by weight of the durable press resin solution. The use of a solution of durable press resin having a concentration within said range allows the preparation of homogeneous aqueous compositions which are sufficiently rich in durable press resin for preparing a textile-treating bath.

The amount of polydimethylsiloxane (i) to be used in the process of this invention is not critical and may vary widely. All that is required is that polydimethylsiloxane to by polymerized be emulsified in an aqueous solution consisting essentially of a durable press resin and surface-active siloxane-polymerization catalyst. Thus, so long as there is sufficient water to provide a continuous aqueous phase for the discontinuous siloxane phase, the polymerization of polydimethylsiloxane (i) will proceed in accordance with this invention.

In accordance with an object of this invention it is desirable to prepare an emulsion having a maximum amount of polydimethylsiloxane (i), although less concentrated emulsions may be used, if desired. In another aspect of this invention the amount of polydimethylsiloxane (i) in the emulsion preferably bears a relationship to the amount of durable press resin used therein so that the homogeneous aqueous composition is either suitable for use as a textile-treating composition per se or need only be diluted with water and/or additional durable press resin solution to be so suitable. Accordingly, it is preferred to use from 0.2 to 3.0 parts by weight of polydimethylsiloxane for every 1 part by weight of durable press resin present in the durable press resin solution when preparing the emulsion. In this manner, a preferred textile-treating bath comprising a weight ratio of polydimethylsiloxane to durable press resin having a preferred value of 0.2 may be easily prepared without the need for admixing additional polydimethylsiloxane.

The amount of surface-active siloxane-polymerization catalyst can vary from as little as 0.01 part by weight based on 100 parts by weight of the polydimethylsiloxane (i) and upward, if desired. Generally it is preferred, for a practical polymerization rate, to use at least 0.1 part by weight of catalyst per said basis. Any greater amount can be employed, although it is obviously wasteful to employ large amounts of catalyst when a smaller amount will suffice. Excessive amounts of the acidic catalyst also require excessive amounts of alkaline neutralizer which further contributes to waste. When the surface-active catalyst is the only surfactant used to form the emulsion to be polymerized, it is preferred that a sufficient amount be used to provide at least 5 parts by weight of catalyst per 100 parts by weight of water in the emulsion.

Thus, in preparing the emulsion consisting essentially of polydimethylsiloxane (i), surface-active catalyst (ii) and aqueous solution of durable press resin (iii) the durable press resin solution (iii) can range in concentration from dilute to saturated, preferably from 20 to 60 percent by weight resin, and the amount of polydimethylsiloxane (i) can vary from a minimum to a maximum-emulsifiable amount, preferably from 0.2 to 3.0 times the amount of durable press resin (on a solute basis) present in the emulsion. The proper amount of surface-active siloxane-polymerization catalyst is then determined from a knowledge of the amount of polydimethylsiloxane (i) and water in the emulsion, as well as the amount of any added surfactants, as noted below, present therein.

In practicing the process of this invention the emulsion may be prepared by any of several suitable methods. Preferably the surface-active catalyst is dispersed in the aqueous solution of durable press resin and the polydimethylsiloxane is thereafter admixed to form a stable emulsion. Alternately, the surface-active catalyst and the polydimethylsiloxane may be added simultaneously to the aqueous solution of durable press resin or the polydimethylsiloxane may be emulsified in an aqueous solution of durable press resin, using suitable emulsifying means, and the surface-active siloxane-polymerization catalyst then added thereto. Other methods of preparing said emulsion will by obvious to one skilled in the emulsion polymer art. It is only necessary to prepare a stable aqueous emulsion consisting essentially of a polydimethylsiloxane, a surface-active siloxane-polymerization catalyst and an above-delineated water-soluble durable press resin. Preferably the polydimethylsiloxane and the surface-active catalyst are not mixed in the absence of the durable press resin.

Emulsification of the polydimethylsiloxane (i) can be aided, if desired, by the use of a nonionic or anionic surfactant or emulsifying agent; however, emulsification may be fully achieved by the sole action of the siloxane polymerization catalyst which is a surface-active material. Such nonionic emulsifying agents as saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine, and anionic emulsifying agents as alkali metal sulforicinates, sulfonated glyceryl esters of fatty acids, salts of sulfonated monovalent alcohol esters, amides of amino sulfonic acid such as the sodium salt of oleyl methyl tauride, sulfonated aromatic hydrocarbon alkali salts such as sodium α-naphthalene monosulfonate, condensation products to naphthalene sulfonic acids with formaldehyde, and sulfates such as ammonium lauryl sulfate, triethanol amine lauryl sulfate and sodium lauryl ether sulfate can be employed. The alkali metal salts, particularly the sodium salts, of the acid catalyst of this invention are particularly useful when additional emulsifying agent is desired.

At the present time, to prepare a suitable emulsion for the method of this invention, it is necessary to use a homogenizer to adequately disperse the polydiorganosiloxane (i) in the aqueous solution of durable press resin, when the surface-active siloxane-polymerization catalyst is the only surfactant. By using a homogenizer one can obtain an emulsion comprising a discontinuous-phase of particles of less than 1 $\mu$m in diameter, which is particularly suited for preparing a homogeneous aqueous composition of this invention which has long-term storage-stability.

The emulsion consisting essentially of polydimethylsiloxane surface-active, siloxane-polymerization catalyst and durable press resin solution is then allowed to react, with or without agitation, at the desired temperature as the polydimethylsiloxane polymerizes. It is to be understood that the emulsification process and polymerization process may or may not be performed concurrently, depending upon the particular method used to prepare the emulsion. For example, when the polydimethylsiloxane is added to the mixture of durable press resin solution and surface-active siloxane-polymerization catalyst, polymerization of a portion of the emulsified polydimethylsiloxane may occur before all of the polydimethylsiloxane is emulsified. Alternately, when the surface-active catalyst is added last the polydimethylsiloxane may be completely emulsified before any polymerization begins. In any event the polydimethylsiloxane is polymerized in dispersed contact with the aqueous solution of durable press resin.

Polymerization of the polydimethylsiloxane (i) may be conducted at any suitable temperature, preferably between room temperature and 100° C.

The time of polymerization is not critical but will vary depending upon the speed of the polymerization reaction and the viscosity increased desired for the resulting polydimethylsiloxane. It has been found that as the polymerization proceeds the viscosity of the polydimethylsiloxane will increase and the average size of the emulsion droplets will decrease.

A preferred method of this invention comprises preparing an emulsion of desired amounts of polydimethylsiloxane, surface-active siloxane-polymerization catalyst and aqueous solution of durable press resin at approximately room temperature and thereafter heating the emulsion at approximately 80° C. for 4 hours to effect polymerization of the polydimethylsiloxane.

Regardless of the temperatures that are used during the practice of the method of this invention the polymerization is allowed to proceed until the desired degree of molecular aggregation is obtained. By molecular aggregation it is meant the extent of polymerization as indicated by the viscosity of the polydimethylsiloxane emulsion polymer, as determined by any suitable method. For example, the polydimethylsiloxane emulsion polymer may be precipitated from a sample of the emulsion by the addition of a water-soluble alcohol such as a methanol, ethanol or isopropanol to the suitably cooled sample and the viscosity of the precipitated polymer determined by well-known methods. Alternately, the desired degree of molecular aggregation may be roughly estimated, after gaining experience in the practice of this invention, by visual inspection of the emulsion per se.

A suitable degree of molecular aggregation may be indicated when the polymer viscosity has a value of at least 0.1 Pa·s, preferably at least 3 Pa·s at 25° C. There does not appear to be an upper limit to the degree of molecular aggregation desired when the resulting homogeneous aqueous composition of this invention is to be used for preparing a textile-treating bath, however, hydroxy-endblocked polydimethylsiloxanes having a viscosity of at least 10 Pa·s, preferably at least 50 Pa·s at 25° C. are of particular interest for providing a pleasing "hand" to fabrics treated therewith.

While not wishing to limit this invention, it appears that the polydimethylsiloxane emulsion polymer consists essentially of a mixture of major amounts of hydroxyl-endblocked linear polydimethylsiloxanes and minor amounts of cyclopolydimethylsiloxane and is essentially free of durable press resins copolymerized therewith. The cyclopolydimethylsiloxane is never fully consumed since its concentration reaches an equilibrium value.

When the desired degree of molecular aggregation has been obtained the surface-active siloxane-polymerization catalyst is neutralized. Neutralization may be accomplished by adding any alkaline material such as inorganic bases such as ammonium hydroxide, sodium hydroxide, potassium carbonate and lithium bicarbonate and organic bases such as triethylamine and triethanolamine in sufficient amount to establish the pH of the emulsion at approximately 7. Neutralization of the surface-active catalyst is done to stabilize the emulsions against further change in molecular aggregation.

The neutralization emulsion may be further stabilized by the addition of a suitable amount of any of the above-noted nonionic or anionic emulsifying agents thereto, if desired, although this is not necessary. This may be in addition to any additional emulsifying agent that was added to prepare the emulsion of (i), (ii), and (iii).

Components which are common to textile-treating compositions may be added to the compositions of this invention at any suitable time as long as the polymerization of the polydimethylsiloxane is not prematurely inhibited or the homogeneous aqueous composition prematurely destabilized. Examples of such components included perfumes, colorants, blueing agents, optical brighteners and flammability control additives. The compatibility of each component with the emulsion or with the homogeneous aqueous composition and any possibility of deleterious effects on the performance of the compositions of this invention should be verified. Preferably said common components are not admixed with the emulsion of step (A).

As noted above, the homogeneous compositions of this invention may also be diluted with water and/or additional durable press resin if needed. Thereby said homogeneous aqueous compositions comprising a polydimethylsiloxane and a durable press resin are useful for preparing a textile-treating bath for providing durable-press and wash-and-wear characteristic to cellulose-containing textiles and garments in the well-known manner.

While the compositions of this invention may be used in a manner essentially identical to the manner of use of mixtures of polydimethylsiloxane emulsions with durable press resin and appear to give essentially identical results on a textile, said compositions do not appear to be identical with a simple blend of polydimethylsiloxane emulsion polymer and durable press resin solution. This is indicated by the observation that a simple blend of 40 weight percent polydimethylsiloxane emulsion polymer and 40 weight percent DMDHEU resin solution will separate after one freeze-thaw cycling whereas a composition of this invention prepared by polymerizing cyclopolydimethylsiloxane in 40 weight percent DMDHEU resin solution does not separate after said freeze-thaw cycling.

It is believed that the best way to practice this invention is set forth in the following examples which are to be taken as illustrating but not limiting this invention. All parts and percentages are by weight, unless stated otherwise.

EXAMPLE 1

A mixture of 1000 parts of a 40 percent aqueous solution of DMDHEU resin (Resin WNM from BI-Chem Division of Burlington Industries) and 35.6 parts of dodecylbenzenesulfonic acid (BioSoft S-100 from Stephan Chemical Co.) was mixed with 950 parts of cyclopolydimethylsiloxanes using moderate agitation for 20 minutes. The mixture was then homogenized once at 7000 psig and once at 3500 psig using a laboratory homogenizer. No particles could be seen in this emulsion using a magnification of 900 ×. The homogenized mixture was then mixed with an additional 35.6 parts of dodecylbenzenesulfonic acid in 70 parts of DMDHEU resin solution and the resulting mixture comprising 2.2 parts of siloxane per 1.0 part of DMDHEU was heated at 80° C. for 4 hours while being agitated. The mixture was then cooled to 45° C. and the sulfonic acid was neutralized with 43.3 parts of triethanolamine dissolved in 83.8 parts of DMDHEU resin solution. The neutralized homogeneous aqueous composition comprising a polydimethylsiloxane and a durable press resin was then further mixed with 116 parts of a 70 percent solution of octylphenoxypolyethoxy ethanol in water (Igepal CA-897 from GAF) mixed with 30 parts of DMDHEU resin solution. The product was free of visible particles at 900 × magnification and showed no oiling or separation after a month at room temperature.

Four textile-treating compositions were prepared by mixing 2.0 parts of the above prepared homogeneous aqueous composition, 8.7 parts of DMDHEU resin solution (Resin WNM) 0.2 parts of octylphenoxypolyethoxy ethanol (Igepal CA-897), 2 parts of a curing catalyst for the durable press resin and 87 parts of water. Compositions 1 and 2 used an aqueous solution of $MgCl_2$ (Curite Mg from Proctor Chemical) as said curing catalyst while Compositions 3 and 4 used an aqueous solution of $Zn(NO_3)_2$ (Curite Zn from Proctor Chemical) as said curing catalyst. Compositions 2 and 4 additionally contained 0.1 parts of methyltrimethoxy silane as a crosslinking agent for the hydroxy-endblocked polydimethylsiloxane emulsion polymer.

For comparison a textile-treating bath was prepared by the prior-art method and was designated Composition 5. This composition was prepared by mixing 10.0 parts of the 40 percent resin solution that was used to prepare the above homogeneous mixture and 85.6 parts of water. To this mixture was mixed 2.0 parts of a 40 percent silicone emulsion that was prepared as above except that water was substituted for Resin WNM in the process, 2.0 parts of Curite Mg, 0.1 part of acetic acid, 0.1 part of methyltrimethoxy silane and 0.2 part of a tin catalyst comprising dibutyltindi(isooctylmercapto acetate) in water.

Compositions 1 to 5 were used to treat 50/50 polyester/cotton fabric samples by padding samples at 40 psi with one of the compositions and curing the padded samples at 350° F. (177° C.) for 5 minutes. Each fabric sample received approximately 0.5 percent polydimethylsiloxane and 10 percent DMDHEU resin based on the weight of the fabrics.

Each sample was then washed five times (AATCC Test Method 124-1975) and tested for flat appearance (AATCC Test Method 124-1975) and shrinkage (AATCC Test Method 135-1973). The samples treated with textile-treating baths prepared by the method of this invention had essentially equivalent shrinkage and slightly inferior flat appearance compared to the sample treated per the prior art as noted in the Table.

TABLE

| Composition Number | Flat Appearance | Shrinkage (%) | |
|---|---|---|---|
| | | Warp | Fill |
| 1 | 3.5 | 0.5 | 0.8 |
| 2 | 3.4 | 0.6 | 0.8 |
| 3 | 3.3 | 0.7 | 0.5 |
| 4 | 3.4 | 0.8 | 0.6 |
| 5[1] | 3.8 | 0.5 | 0.6 |

[1]Prior art composition for comparison purposes only.

EXAMPLE 2

A mixture of 1551 parts of a DMDHEU resin solution (Resin WNM), 367.5 parts of cyclopolydimethylsiloxane and 35.6 parts of dodecylbenzenesulfonic acid was homogenized as in Example 1, and thereafter mixed with an additional 35.6 parts of the sulfonic acid dissolved in 70 parts of DMDHEU resin solution. The resulting mixture comprising 0.57 parts of siloxane per 1.0 part of resin was heated at 80° C. for 4 hours. The emulsion was then cooled to 45° C., mixed with 43.3 parts of triethanolamine dissolved in 83.6 parts of the DMDHEU resin solution and further mixed with 116 parts of octylphenoxypolyethoxy ethanol dissolved in 30 parts of resin solution. The resulting homogeneous aqueous composition was stable to separation for over 9 months at room temperature.

EXAMPLE 3

A mixture of 1740 parts of DMDHEU resin solution (Resin WNM), 5 parts of dodecylbenzenesulfonic acid and 144 parts of cyclopolydimethylsiloxane was homogenized as in Example 1 and thereafter mixed with an additional 5 parts of the sulfonic acid. The resulting mixture comprising 0.21 parts of siloxane per 1.0 part of resin was heated at 80° C. for 4 hours. The viscosity of the reaction mixture appeared to be low so heating was continued for an additional 2 hours after which the product was allowed to cool to room temperature overnight. The cooled product was neutralized with 10 parts of triethanolamine whereupon it separated. This reaction mixture apparently had a deficiency of sulfonic acid thereby adversely affecting the stability of the neutralized product.

EXAMPLE 4

The preparation of a homogeneous aqueous composition as in Example 1 was repeated except that DMEU durable press resin solution (Protorez EU-50 from Proctor Chemical) was used in place of the DMDHEU durable press resin solution. The homogenized mixture, prior to polymerization, comprised large siloxane particles (approximately 30 μm) which decreased in size during polymerization to approximately 1 μm. After neutralization the product was stable to separation at room temperature for approximately 1 week.

When the above preparation was repeated except that a dimethylolmethyl carbamate durable press resin solution (Protorez CHD from Proctor Chemical) was used in place of the DMEU durable press resin solution the procedure failed because the homogenized mixture separated before polymerization could be attempted.

When the above preparation was repeated using a DMDHEU durable press resin solution containing a zinc salt buffer (Protocol C from Proctor Chemical) the procedure failed because a suitable emulsion could not be formed.

This example illustrates the usefulness of the method of this invention when a cyclopolydimethylsiloxane is polymerized in a DMEU resin solution. This example further illustrates the limitations of the process of this invention with respect to the durable press resin solution in that dimethylolmethyl carbamate resin solutions and DMDHEU resin solutions containing zinc salts appear to be unsuitable for use with a cyclopolydimethylsiloxane (i).

EXAMPLE 5

The preparation of a homogeneous aqueous composition of Example 1 was repeated except that a hydroxyl-endblocked polydimethylsiloxane fluid having a viscosity of 70 mPa·s at 25° C. was used instead of the cyclopolydimethylsiloxane. Polymerization of the hydroxyl-endblocked polydimethylsiloxane produced a polydimethylsiloxane having a viscosity of approximately 200 Pa·s at 25° C. The neutralized product was stable to separation at room temperature for one week. A sample of the product that was not neutralized remained stable to separation at room temperature for longer than one month.

EXAMPLE 6

The preparation of Example 5 was repeated except that a DMEU durable press resin solution (Protorez EU-50 from Proctor Chemical) was used instead of the DMDHEU durable press resin solution. Essentially the same results were obtained except that the unneutralized sample also was stable to separation for only one week.

The above preparation was repeated except that a DMDHEU durable press resin solution buffered with zinc salts (Protocol C from Proctor Chemical) was used instead of the unbuffered DMDHEU durable press resin solution. Homogenization was successful but polymerization did not occur.

The above preparation was repeated except that a dimethylolmethyl carbamate durable press resin solution (Protorez CHD from Proctor Chemical) was used instead of the DMDHEU durable press resin solution. Homogenization was not successful and polymerization was not attempted.

This example illustrates the usefulness of the method of this invention when a hydroxy-endblocked linear polydimethylsiloxane is polymerized in a DMEU resin solution. This example further illustrates the limitation of the process of this invention with respect to the durable press resin solution in that dimethylolmethyl carbamate resin solution and DMDHEU resin solution containing zinc salts appear to be unsuitable for use with a hydroxy-endblocked linear polydimethylsiloxane (i).

EXAMPLE 7

Samples of the homogeneous aqueous compositions of Examples 1, 2 and 4 were each frozen for 16 hours and then kept at room temperature for 6 to [hours. After this freeze-thaw cycle the samples were still homogeneous and contained no oily film on their surfaces. For comparison, homogeneous aqueous compositions similar to those of Examples 1 and 2 were prepared per a prior art method by repeating the polymerization of cyclopolydimethylsiloxane in water instead of the aqueous solution of durable press resin and the resulting silicone emulsion polymer was mixed with a sufficient amount of the aqueous solution of durable press resin to provide compositions wherein the siloxane/resin ratios were identical to those that were obtained in the homogeneous aqueous compositions of Examples 1 and 2. After being frozen for 16 hours and kept at room temperature for 6–8 hours these comparative samples were 37 and 60 percent by volume separated or broken.

That which is claimed is:

1. A method for preparing a homogeneous aqueous composition comprising a polydimethylsiloxane and a durable press resin, said method comprising
(A) preparing an emulsion consisting essentially of
  (i) a polydimethylsiloxane having a viscosity of less than 100 mPa·s at 25° C. and being selected from the group consisting of cyclopolydimethylsiloxanes and linear, hydroxy-endblocked polydimethylsiloxanes,
  (ii) a surface-active siloxane-polymerization catalyst selected from aliphatic hydrogen sulfates and hydrocarbonsulfonic acids, and
  (iii) an aqueous solution of a durable press resin selected from dimethylolethylene urea and dimethyloldihydroxyethylene urea, (B) allowing the emulsified polydimethylsiloxane to polymerize until a desired increase in molecular aggregation has been obtained, and thereafter p0 (C) neutralizing the surface-active catayst.

2. A method according to claim 1 wherein the polydimethylsiloxane (i) is a cyclopolydimethylsiloxane having an average of from 3 to 9 silicon atoms per molecule, the surface-active siloxane-polymerization catalyst (ii) is dodecylbenzenesulfonic acid, and the aqueous solution of a durable press resin (iii) is an aqueous solution of dimethyloldihydroxyethylene urea.

3. A method according to claim 2 wherein the aqueous solution of a durable press resin (iii) consists essentially of from 20 to 40 parts by weight of the durable press resin for every 100 parts by weight of the solution.

4. A method according to claim 3 wherein the weight ratio of polydimethylsiloxanes to durable press resin in the aqueous solution of durable press resin that is used to prepare the emulsion in (A) has a value of from 0.2 to 3.0.

5. A method according to claim 4 wherein the polymerization of the emulsified polydimethylsiloxane is accomplished at a temperature of approximately 80° C. for approximately 4 hours.

6. A method according to claims 1 or 5 wherein an emulsifying agent is added to the emulsion after the desired increase in molecular aggregation has been obtained.

7. A homogeneous aqueous composition obtained by the process according to claim 1.

8. A homogeneous aqueous composition obtained by the process according to claim 6.

* * * * *

UNITED STATES PATENT AND TRADEMARK OFFICE
CERTIFICATE OF CORRECTION

PATENT NO. : 4,170,581
DATED : October 9, 1979
INVENTOR(S) : Howard E. Griffin

It is certified that error appears in the above-identified patent and that said Letters Patent are hereby corrected as shown below:

Column 4, line 30, the word "usefl" should read --useful--.

Column 6, line 2, the phrase "to by" should read --to be--.

Column 11, line 28, after the word "that" insert the word --a--.

Column 12, line 37, the phrase "for 6 to [hours." should read --for 6 to 8 hours.--.

Column 13, line 3, the phrase "thereafter p0 (C)" should read --thereafter (C)--.

Signed and Sealed this

Seventeenth Day of November 1981

[SEAL]

Attest:

GERALD J. MOSSINGHOFF

Attesting Officer

Commissioner of Patents and Trademarks